US010808141B2

(12) United States Patent
Klein et al.

(10) Patent No.: US 10,808,141 B2
(45) Date of Patent: Oct. 20, 2020

(54) REACTIVE RESIN SEALING FOR LOW-CONTAMINANT COLD PLASTIC MARKINGS

(71) Applicant: Roehm GmbH, Darmstadt (DE)

(72) Inventors: Alexander Klein, Gau-Algesheim (DE); Ralf Debes, Krombach (DE); Oliver Schmidt, Freigericht (DE); Peter Reinhard, Dreieich-Dreieichenhain (DE)

(73) Assignee: Roehm GmbH, Darmstadt (DE)

( * ) Notice: Subject to any disclaimer, the term of this patent is extended or adjusted under 35 U.S.C. 154(b) by 500 days.

(21) Appl. No.: 15/502,324

(22) PCT Filed: Aug. 13, 2015

(86) PCT No.: PCT/EP2015/068610

§ 371 (c)(1),
(2) Date: Feb. 7, 2017

(87) PCT Pub. No.: WO2016/026757

PCT Pub. Date: Feb. 25, 2016

(65) Prior Publication Data

US 2017/0226370 A1 Aug. 10, 2017

(30) Foreign Application Priority Data

Aug. 20, 2014 (EP) .................................... 14181556

(51) Int. Cl.

| | |
|---|---|
| ***C08K 3/00*** | (2018.01) |
| ***C08K 3/26*** | (2006.01) |
| ***C08K 3/34*** | (2006.01) |
| ***C08K 3/40*** | (2006.01) |
| ***C09D 133/12*** | (2006.01) |
| ***C09D 4/06*** | (2006.01) |
| ***E01F 9/518*** | (2016.01) |
| ***C09D 133/06*** | (2006.01) |
| ***B05D 1/02*** | (2006.01) |
| ***E01C 23/20*** | (2006.01) |
| *C08K 3/22* | (2006.01) |

(52) U.S. Cl.

CPC ............ *C09D 133/12* (2013.01); *B05D 1/02* (2013.01); *C08K 3/00* (2013.01); *C09D 4/06* (2013.01); *C09D 133/06* (2013.01); *E01C 23/20* (2013.01); *E01F 9/518* (2016.02); *C08K 3/22* (2013.01); *C08K 3/26* (2013.01); *C08K 3/34* (2013.01); *C08K 3/40* (2013.01); *C08K 2003/2241* (2013.01); *C08K 2003/265* (2013.01)

(58) Field of Classification Search

CPC .............. B05D 1/02; C08K 2003/2241; C08K 2003/265; C08K 3/00; C08K 3/22; C08K 3/26; C08K 3/34; C08K 3/40; C09D 133/06; C09D 133/12; C09D 4/06; E01F 9/518; E01C 23/20

See application file for complete search history.

(56) References Cited

U.S. PATENT DOCUMENTS

| | | | | |
|---|---|---|---|---|
| 9,023,971 | B2 * | 5/2015 | Neugebauer ......... | C08G 18/755 528/75 |
| 9,175,171 | B2 * | 11/2015 | Neugebauer ............. | C09D 4/06 |
| 9,701,846 | B2 * | 7/2017 | Protzmann ............. | C09D 5/004 |
| 2009/0047437 | A1 * | 2/2009 | Yoshii ...................... | B05D 7/56 427/407.1 |
| 2009/0253845 | A1 * | 10/2009 | Neugebauer ............. | C09D 4/06 524/423 |
| 2014/0296384 | A1 * | 10/2014 | Hazra ................. | C09D 133/08 523/437 |
| 2014/0350171 | A1 * | 11/2014 | Matsumoto ........... | C08F 236/20 524/559 |

FOREIGN PATENT DOCUMENTS

| | | | | |
|---|---|---|---|---|
| DE | 10 2012 208 818 | A1 | 11/2013 | |
| WO | 2013/185993 | A1 | 12/2013 | |
| WO | WO-2013185993 | A1 * | 12/2013 | .............. C08K 5/18 |

OTHER PUBLICATIONS

International Search Report dated Sep. 4, 2015 in PCT/EP2015/068610 filed Aug. 13, 2015.

European Search Report dated Jan. 28, 2015 in European Application 14181556.3 filed Aug. 20, 2014.

* cited by examiner

*Primary Examiner* — Latosha Hines

(74) *Attorney, Agent, or Firm* — Oblon, McClelland, Maier & Neustadt, L.L.P.

(57) ABSTRACT

The present invention encompasses a novel soil-repellent reactive resin seal for markings or coating of areas of ground or trafficways, for example roads, based on cold plastic. Compared to established prior art systems, this sealing leads to reduced adhesion of soil, especially in hot and/or dry, dusty environments. Thus, the marking retains better visibility than conventional markings, even in dry, hot regions. Otherwise, the marking sealed in accordance with the invention has comparable mechanical properties to the prior art.

19 Claims, No Drawings

REACTIVE RESIN SEALING FOR LOW-CONTAMINANT COLD PLASTIC MARKINGS

FIELD OF THE INVENTION

The present invention encompasses a novel soil-repellent reactive resin seal for markings or coating of areas of ground or trafficways, for example roads, based on cold plastic. Compared to established prior art systems, this sealing leads to reduced adhesion of soil, especially in hot and/or dry, dusty environments. Thus, the marking retains better visibility than conventional markings, even in dry, hot regions. Otherwise, the marking sealed in accordance with the invention has comparable mechanical properties to the prior art.

A series of demands are made on modern road and trafficway markings. Firstly, such systems are expected to provide simple applicability to the road surface and simultaneously high stability, and also a long lifetime of the marking. Also of significance are rapid processibility and especially processibility within a very wide temperature window. This is especially true of road markings in regions where there is a very dry, hot climate with a high dust or sand content in the air.

In a hot climate with persistent aridity, trafficway markings are subject to significant adhering soil. This particularly involves asphalt binder constituents which, at high temperature, are displaced by tyres from the road surface onto the marking. At high temperatures, as a result of the tyre pressure, this tacky soil is introduced into the marking material itself, or into the pores of the marking surface, especially in the case of marking materials having thermoplastic character. After prolonged aridity, this introduced soil cannot be washed out again even by recurrent rain. The functionality, i.e. visibility of the marking, and the safety of the drivers and passengers is significantly impaired in a lasting manner by this soil.

PRIOR ART

Cold plastic materials for (multicomponent) cold plastic markings are generally mixtures of reactive resins, or binders based on reactive resins, pigments, additives and fillers, which are mixed with a curing agent component immediately prior to processing, and this mixture of cold plastic material and curing agent is poured out manually or by machine or sprayed onto the road surface. Reactive resin binders used for cold plastics are solutions of polymers (preferably (meth)acrylate polymers) in (meth)acrylate monomers.

The wording "poly(meth)acrylates" in the context of this document encompasses both polymethacrylates and polyacrylates, and copolymers or mixtures of the two. The wording "(meth)acrylates" correspondingly encompasses methacrylates, acrylates or mixtures of the two.

The cured cold plastic markings must have sufficient flexibility to assure sufficiently low-stress bonding to asphalt road surfaces, for instance in the event of temperature variations as occur between day and night or between shade or high insolation, and to be able to withstand dynamic stress by the traffic thereon in a lasting manner. This flexibility is generally achieved through soft segments in the reactive resin binder, i.e. with copolymerization of "soft" monomers such as butyl methacrylate, butyl acrylate, ethylhexyl acrylate, which brings about a low glass transition temperature of the cold plastic binders. The surface of the cured cold plastic material, because of the pasty character required for processing reasons, has a certain porosity.

Trafficway marking materials currently being used are systems such as solvent-based paints, aqueous paints, thermoplastic marking materials, marking materials based on reactive resins, and prefabricated adhesive tapes. The latter have the drawback of being difficult to produce and to apply. With regard to a desirable long life of the marking, there are also only limited degrees of freedom with regard to the configuration of the marking, for example with glass beads. Furthermore, all these systems, i.e. solvent- or water-based markings, and thermoplastic systems or reactive resin-bound multicomponent systems which are applicable, for example, as cold plastic, have a tendency to absorb particles at the surface to a high degree in a hot, dusty environment. This soiling is firstly often irreversible, meaning that even water or rain does not remove it again, and it has the effect that the markings as such can only be seen with difficulty, if at all.

Solvent- and water-based systems, and also thermoplastic systems, are much less wear-resistant and are therefore less permanent than cold plastic systems. Cold plastic systems, even at high ambient temperatures on busy roads with high traffic load on the marking as a result of frequently being run over, are subject to wear only to a very small degree by comparison. However, the high-quality prior art cold plastic systems become soiled with similar speed to thermoplastic systems, for example, in a persistently dry and hot climate as a result of the bitumen displacement and soil adhering thereon.

An established system for marking of roads or for ground coating is that known as reactive resins. These are generally 2-pack systems including monomers, polymers and further components, for example fillers, auxiliaries or glass beads. One pack of the 2-pack systems contains an initiator component, and the second pack an accelerator. Prior to application, these two packs are mixed with one another and applied to the road or floor within a pot life. However, the lifetime of these markings depends on their elasticity. Thus, there is a dilemma here for use in particularly hot regions. The prior art markings become much softer and also slightly tackier at temperatures above 40° C. However, this leads to much easier soiling as a result of adhesion of flying dust particles or sand grains. If the reactive resins, in contrast, are made harder, this effect can be counteracted, but on the other hand the abrasion propensity of the marking also increases. This in turn lowers the lifetime thereof.

Seals on road markings are actually unusual in practice, since a multilayer application is relatively complex and requires additional storage. Nevertheless, multilayer road markings have also been described in the prior art for the solution of some technical problems.

However, most prior art multilayer systems relate to markings with which special optical effects are to be achieved. For instance, WO 2010/019930 describes an additional phosphorescent layer.

In EP 0 299 744, a second layer is applied, in order to give particularly good distribution of the glass beads embedded therein on the surface. This upper, second layer is formed from polyolefins, polyolefin-containing terpolymers or chlorinated polyolefin resins. The person skilled in the art is aware that such materials are subject to rapid abrasion and only a very short lifetime overall.

JP 06010319 describes a reactive resin as top layer for a marking based on solvent or a thermoplastic melt. The top layer is a radiation-curing system which serves particularly to bring glass beads to the surface of the road marking in order to enhance light reflection. No exceptional heat resistance or soiling resistance is found with the system. Moreover, there are the drawbacks that the two layers can be applied only with a great time interval, and that the top layer additionally has to be cured by means of controlled irradiation.

A very similar system having a clear topcoat for protection of the glass beads is found in JP 58063761. This system has the same disadvantages as that described above.

Problem

The problem addressed by the present invention is that of providing road markings or ground coatings for outdoor use, which have a particularly long lifetime compared to the prior art, even at very high ambient temperatures, for example in desert regions, and simultaneously only very low soil adhesion compared to the prior art.

The problem addressed by the present invention is more particularly for these road markings or coatings to have soil-repellent properties, very particularly even at ambient temperatures of up to 50° C., persistent aridity and with a high particle content in the air.

Furthermore, such a road marking should be achievable in a simple manner without any need to mix an additional curing agent component into the soil-repellent reactive resin seal.

Further problems not mentioned explicitly will become apparent from the overall context of the description, claims and examples which follow.

Solution

The stated problems were solved by the provision of a novel two-layer road marking or ground coating. Road markings in the context of this invention refer to all coatings applied to trafficways or pathways for marking purposes, which are not just applied temporarily, for example for temporary marking in a construction site area. This especially also includes cycleways, pavements or taxiways for aviation. Ground coatings relate to further coatings of ground materials such as concrete, asphalt, screed or tar, especially outdoors. It should be pointed out that the terms "road markings" and "ground coatings", unless explicitly stated otherwise, mean the coatings already applied to the subsoil. Hereinafter, for the sake of simplicity, the term "road marking" is used to cover all these coatings.

The road markings according to the invention have a lower layer which is a cured 2-pack (meth)acrylate-based reactive resin formulation, and a second, upper layer which is a cured reactive resin seal.

The lower, first layer consists especially of a material which, prior to curing, in one or both packs, contains at least 0.3% by weight of crosslinker, at least 4% by weight of (meth)acrylate monomers, at least 2% by weight of prepolymers and optionally further additives.

Preferably, the two packs of the reactive resin for production of the lower, first layer together include the following ingredients:

- 0.5% by weight to 30% by weight, 2% by weight to 20% by weight and more preferably 3% by weight to 15% by weight of crosslinker, preferably di-, tri- or tetra(meth) acrylates, more preferably dimethacrylates,
- 10% by weight to 96.1% by weight, preferably 30% by weight to 80% by weight and more preferably 30% by weight to 40% by weight of (meth)acrylates and optionally components copolymerizable with (meth) acrylates, preferably (meth)acrylates having a $C_1$- to $C_6$-alkyl radical,
- 0% by weight to 20% by weight of urethane (meth) acrylates,
- 3% by weight to 45% by weight, preferably 15% by weight to 40% by weight, more preferably 20% by weight to 35% by weight and most preferably to 30% by weight of prepolymers, preferably poly(meth)acrylates and/or polyesters, more preferably poly(meth) acrylates,
- 0.1% by weight to 5% by weight, preferably 0.4% to 2% by weight, more preferably 0.2% to 0.8% by weight, of at least one tertiary amine, preferably a tertiary aromatic amine,
- 0% by weight to 25% by weight, preferably to 20% by weight, more preferably to 15% by weight, of core-shell particles,
- 0.5% by weight to 10% by weight, preferably 1% to 7% by weight, more preferably to 5% by weight, of at least one initiator, preferably dilauroyl peroxide and/or dibenzoyl peroxide, and optionally further auxiliaries.

The initiator(s) and the tertiary amine are present in separate packs of the 2-pack system prior to mixing. With regard to the initiator, it should be noted that the pure initiator is considered in the mass balance. Agents added to the initiator for stabilization and correspondingly added to the reactive resin are not included in the mass balance for the reactive resin. Such agents may, for example, be phlegmatizing agents, oils, solvents, waxes or carrier materials, especially inorganic carrier materials. Especially preferably, the reactive resin for production of the first layer is halogen-free.

The further auxiliaries may, for example, be stabilizers, inhibitors, chain transfer agents, plasticizers or waxes, or phlegmatizing agents.

Preferably, the reactive resin according to the invention is halogen-free.

The first, lower or inner layer may include, as well as at least 15% by weight, especially between 15% and 55% by weight, of cured reactive resin, 0.15% by weight to 25% by weight of an inorganic pigment, preferably titanium dioxide, 0% by weight to 5% by weight of stabilizers and/or additives and 20% by weight to 80% by weight of mineral and/or polymeric fillers.

The second, upper layer is, in accordance with the invention, a cured reactive resin seal composed of up to 50% by weight, preferably of up to 40% by weight, more preferably of up to 20% by weight, of pigments, fillers and/or additives and of at least 50% by weight, preferably of at least 60% by weight, more preferably of at least 80% by weight, of a cured (meth)acrylate resin consisting in turn to an extent of at least 50% by weight of repeat units based on (meth) acrylates and optionally polyesters and having a glass transition temperature $T_g$ of at least 60° C., preferably of at least 70° C., more preferably of at least 80° C. More preferably, however, the second, upper layer is unpigmented.

Preferably, the second, upper layer of the road marking is obtained by curing a reactive resin seal, said reactive resin seal containing, prior to curing, at least the following components:

- 10% to 35% by weight, preferably 15% to 25% by weight, of a poly(meth)acrylate and/or a polyester, preferably a poly(meth)acrylate,
- 40% to 80% by weight, preferably 60% to 75% by weight of monomers, which are (meth)acrylates and/or partly monomers copolymerizable with (meth)acrylates, preferably (meth)acrylates having $C_1$-$C_4$-alkyl radicals,
- 1% to 10% by weight, preferably 2% to 8% by weight, of crosslinker, which is preferably di- and/or tri(meth) acrylates,

- 0% to 5% by weight, preferably 0.4% to 4% by weight, of a tertiary aromatic amine,
- 0% to 25% by weight, preferably to 10% by weight, of pigments and/or fillers,
- 0% to 10% by weight, preferably 2% to 8% by weight, of additives, which are plasticizers, paraffins, UV absorbers, stabilizers and/or blueing agents, and
- 0.1% to 5% by weight, preferably 0.2% to 4% by weight, of one or more initiators, which are combined only shortly before application with the tertiary amine in the mixture, and which are more preferably dilauroyl peroxide and/or dibenzoyl peroxide.

With regard to the mass balance, the same applies to the initiator as already stated for the first, lower layer.

More preferably, the poly(meth)acrylates and/or polyesters have a glass transition temperature $T_g$ of at least 70° C., more preferably of at least 80° C. The monomer component in turn consists preferably to an extent of 50% by weight of those monomers which, in the fully polymerized state, have a glass transition temperature of at least 60° C., preferably of at least 70° C., more preferably of at least 80° C.

The second, upper layer for sealing of the road marking preferably has a thickness of not more than 500 μm, more preferably of not more than 300 μm and most preferably of not more than 200 μm. The first, lower layer preferably has a thickness of not more than 7000 μm. More particularly, the thickness of the first, lower layer is between 200 μm and 3000 μm and more preferably between 400 μm and 2000 μm. Thinner and thicker layers are possible according to the application. In addition, the mechanical properties of the road marking produced with the reactive resins according to the invention are excellent irrespective of the application thicknesses of the two layers.

Optionally, one of the two layers or both layers may have been contacted with a suitable sprinkling agent directly after application. Suitable sprinkling agents are, for example, reflectants such as glass beads or ceramic platelets, and aggregates for anti-skid adjustment and/or colour effects, such as bauxite, corundum, granite, sand or glass pellets, where the aggregates may optionally be coloured.

Preferably, the second, upper layer at 23° C. has a tensile strain at break, measured to DIN 527, measured on specimens which have been produced by polymerizing the reactive resin in a steel chamber having thickness 4 mm and subsequently machining the tensile specimens, of less than 10%, preferably less than 7.5%, more preferably less than 5.0% and most preferably less than 2.5%. After the reactive resin seal has been cured at 23° C. and conditioned for 72 h, the Shore D hardness to DIN 53505 measured at 23° C. is preferably 60 units, more preferably at least 70 units. Equally preferably, the (meth)acrylate resin for production of the second layer prior to application has a viscosity at 23° C., measured to DIN 53015, of between 50 and 500 mPas, preferably between 50 and 250 mPas.

The road markings according to the invention have a number of great advantages over the prior art. For instance, the second, upper layer, with respect to the first, lower layer, has good surface wetting and hence good adhesion thereon. This in turn increases the lifetime of the road marking. In addition, the road marking of the invention has high abrasion resistance, even when run over regularly by heavy vehicles. This is especially true, as required, in the case of particularly high temperatures and in dry and dusty environments. Moreover, the novel upper, second layer on application in a low layer thickness of less than 500 μm, especially of less than 200 μm, does not significantly impair the visibility of the road marking under temperate climatic conditions, but considerably improves it in use under constantly hot and dry weather conditions by reducing the soil uptake.

More particularly, a pore-free marking material surface which is hard even at elevated temperatures is achieved through the use of the soil-repellent reactive resin seal according to the invention for the second, upper layer. The latter can be well distributed in a thin layer on the lower, first layer, which generally takes the form of a previously laid cold plastic marking surface, due to low viscosity and good wetting. After the curing, the second, upper layer according to the invention does not escape even at elevated ambient temperatures.

The system can also be optimized with regard to the subsoil to be coated, by means of choice of suitable monomers, prepolymers and/or adhesion promoters. The systems according to the invention are correspondingly optimizable in a variable manner for the marking of asphalt, concrete or natural stone surfaces.

Specific Aspects of Road Marking

Said tertiary aromatic amines which find use as accelerators in the context of this invention include, for example, N,N-dimethyl-p-toluidine, N,N-bis(2-hydroxyethyl)-p-toluidine or N,N-bis(2-hydroxypropyl)-p-toluidine.

Initiators used are especially peroxides or azo compounds. Under some circumstances, it may be advantageous to use a mixture of various initiators. Preference is given to using halogen-free peroxides as free-radical initiator. For reactive resins for use for road markings, for example, particular preference is given to dilauroyl peroxide or dibenzoyl peroxide.

In general, the peroxide in the second pack has been admixed with a diluent, for example with a phthalate such as dibutyl phthalate, an oil or another plasticizer. However, the above-specified concentrations in the reactive resins used in accordance with the invention relate only to the pure initiator.

In an alternative embodiment of an alternative 2-pack or 3-pack system, the accelerator is present in the second pack, for example in a diluent, and the initiator, for example peroxide, is part of the reactive resin according to the invention. The optional third pack again comprises the glass beads and any adhesion promoters required.

A further constituent of the reactive resin according to the invention may be the crosslinkers, especially polyfunctional methacrylates such as allyl (meth)acrylate. Particular preference is given to di- or tri(meth)acrylates, for example butane-1,4-diol di(meth)acrylate, poly(urethane) (meth) acrylates, tetraethylene glycol di(meth)acrylate, triethylene glycol di(meth)acrylate or trimethylolpropane tri(meth) acrylate. The crosslinker content is distinctly increased compared to the prior art and is between 13% by weight and 35% by weight, preferably between a minimum of 20% by weight and a maximum of 30% by weight. It has been found that, surprisingly, this relatively high proportion of crosslinker does not just bring about high initial curing but also enables, in combination with the other components, rapid readiness of the road marking comprising resin according to the invention for traffic overrunning.

The optionally present urethane (meth)acrylates are understood in the context of this invention to mean compounds having (meth)acrylate functionalities joined to one another via urethane groups. These are obtainable by reacting hydroxyalkyl (meth)acrylates with polyisocyanates and polyoxyalkylenes having at least two hydroxyl functionalities. Rather than hydroxyalkyl (meth)acrylates, it is also possible to use esters of (meth)acrylic acid with oxiranes, for example ethylene oxide or propylene oxide, or corresponding oligo- or polyoxiranes. An overview of urethane (meth) acrylates having a functionality of greater than two, for example, can be found in DE 199 02 685. A commercially available example prepared from polyols, isocyanates and hydroxy-functional (meth)acrylates is EBECRYL 210-5129 from UCB Chemicals. Urethane (meth)acrylates in a reactive resin, without any great temperature dependence, increase flexibility, breaking strength and elongation at break. As has been found in a surprising manner, this affects the road marking in two ways: The thermal stability of the marking increases and, particularly surprisingly, the disadvantages of a higher crosslinking level, caused by the higher crosslinker content, with regard to embrittlement and adhesion to the trafficway surface, can be compensated for or even improved upon compared to cold plastics according to the prior art. For this purpose, a relatively high concentration of the urethane (meth)acrylates for road markings in the reactive resin is needed. The reactive resin according to the invention therefore optionally contains between 5% by weight and 30% by weight, preferably between 10% by weight and 20% by weight, of the urethane (meth)acrylates described.

The monomers present in the reactive resin are compounds selected from the group of the (meth)acrylates, for example alkyl (meth)acrylates of straight-chain, branched or cycloaliphatic alcohols having 1 to 40 carbon atoms, for example methyl (meth)acrylate, ethyl (meth)acrylate, n-butyl (meth)acrylate, 2-ethylhexyl (meth)acrylate, stearyl (meth)acrylate, lauryl (meth)acrylate; aryl (meth)acrylates, for example benzyl (meth)acrylate; mono(meth)acrylates of ethers, polyethylene glycols, polypropylene glycols or mixtures thereof having 5 to 80 carbon atoms, for example tetrahydrofurfuryl (meth)acrylate, methoxy(m)ethoxyethyl (meth)acrylate, benzyloxymethyl (meth)acrylate, 1-ethoxybutyl (meth)acrylate, 1-ethoxyethyl (meth)acrylate, ethoxymethyl (meth)acrylate, poly(ethylene glycol)methyl ether (meth)acrylate and poly(propylene glycol) methyl ether (meth)acrylate.

Suitable constituents of monomer mixtures also include additional monomers having a further functional group, such as α,β-unsaturated mono- or dicarboxylic acids, for example acrylic acid, methacrylic acid or itaconic acid; esters of acrylic acid or methacrylic acid with dihydric alcohols, for example hydroxyethyl (meth)acrylate or hydroxypropyl (meth)acrylate; acrylamide or methacrylamide; or dimethylaminoethyl (meth)acrylate. Further suitable constituents of monomer mixtures are, for example, glycidyl (meth) acrylate or silyl-functional (meth)acrylates.

As well as the (meth)acrylates detailed above, the monomer mixtures may also include further unsaturated monomers copolymerizable with the aforementioned (meth)acrylates by means of free-radical polymerization. These include 1-alkenes or styrenes.

Specifically, the poly(meth)acrylate will conveniently be selected by content and composition with regard to the desired technical function.

In a particularly preferred embodiment, the monomers wholly or partly comprise (meth)acrylates present in the form of esters of (meth)acrylic acid with an acetal, ketal or carbonate of glycerol, substituted glycerol or trimethylolpropane or substituted trimethylolpropane, i.e. monomers of the general structural formulae (1) or (2):

(1)

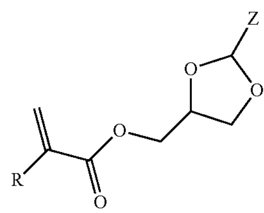

(2)

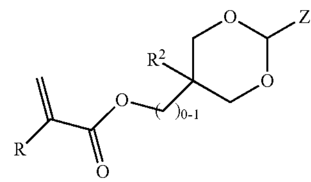

R = H, Me
$R_2$ = H, Et
Z = H, (=O), alkyl, benzyl, aryl, O-alkyl

Preferred examples of such monomers are glycerol formal (meth)acrylate, trimethylolpropane formal (meth)acrylate or isopropylidene glycerol (meth)acrylate (solketal methacrylate). A particular advantage of these monomers is the particularly low vapour pressure and hence the odourlessness of the reactive resin prior to application.

The reactive resins of the invention may additionally optionally contain core-shell particles as impact modifiers. Details of the addition of such particles to a reactive resin can be found in international application WO 2011/072846, or in German patent application 102011003317.3. The core-shell particles lead to higher mechanical durability and additionally to a reduction in crack propagation and a higher tolerance to point stress.

The core-shell particles have to have good dispersion in the monomer-polymer mixture of the reactive resin, in order not to cause any turbidity or lump formation. This can be assured in a simple manner by appropriate stirring or by means of another known dispersion technique.

Auxiliaries and additives used in addition may be chain transfer agents, plasticizers, paraffins, stabilizers, inhibitors, waxes and/or oils.

The paraffins are added in order to prevent inhibition of polymerization by the oxygen in the air. For this purpose, several paraffins having different melting points may be used in different concentrations.

Chain transfer agents used may be any compounds known from free-radical polymerization. Preference is given to using mercaptans such as n-dodecyl mercaptan. Plasticizers used are preferably esters, polyols, oils, low molecular weight polyethers or phthalates.

In addition, the formulations for road marking may have the following additions: dyes, glass beads, fine and coarse fillers, wetting, dispersing and leveling aids, UV stabilizers, defoamers and rheology additives.

For the field of use of formulations as trafficway marking or area marking, auxiliaries and additives added are preferably dyes. Particular preference is given to white, red, blue, green and yellow inorganic pigments, particular preference to white pigments such as titanium dioxide.

Glass beads are preferably used in formulations for trafficway markings and area markings as reflectants. The commercial glass beads used have diameters of 10 μm to 2000 μm, preferably 50 μm to 800 μm. For better processing and adhesion, the glass beads may be provided with an adhesion promoter. The glass beads may preferably be silanized.

In addition, one or more mineral fine fillers and coarse fillers may be added to the formulation. These materials also serve to prevent skidding and are therefore used especially to improve grip and to additionally colour the road marking. Fine fillers from the group of calcium carbonates, barium sulfates, quartzes, quartz flours, precipitated and fumed silicas, pigments and cristobalites, and corundum are used. Coarse fillers used are quartzes, cristobalites, corundums and aluminium silicates.

It is likewise possible to use conventional UV stabilizers. The UV stabilizers are preferably selected from the group of the benzophenone derivatives, benzotriazole derivatives, thioxanthonate derivatives, piperidinolcarboxylic ester derivatives or cinnamic ester derivatives.

From the group of stabilizers or inhibitors, preference is given to using substituted phenols, hydroquinone derivatives, phosphines and phosphites.

The following components may optionally also be present in formulations for road marking:

Wetting agents, dispersants and levelling auxiliaries used are preferably selected from the group of alcohols, hydrocarbons, glycol derivatives, derivatives of glycolate esters, acetic acid esters and polysiloxanes, polyethers, polysiloxanes, polycarboxylic acids, saturated and unsaturated polycarboxylic acid aminoamides.

Rheology additives used are preferably polyhydroxycarboxamides, urea derivatives, salts of unsaturated carboxylic acid esters, alkylammonium salts of acidic phosphoric acid derivatives, ketoximes, amine salts of p-toluenesulphonic acid, amine salts of sulphonic acid derivatives and aqueous or organic solutions or mixtures of the compounds. It has been found that rheological additives based on fumed or precipitated, optionally also silanized, silicas having a BET surface area of 10-700 $nm^2/g$ are particularly suitable.

Defoamers are preferably selected from the group of alcohols, hydrocarbons, paraffin-based mineral oils, glycol derivatives, derivatives of glycolic esters, acetic esters and polysiloxanes.

Method

In principle, with regard to the application methodology for the two layers, the road marking according to the invention is usable in a flexible manner. The reactive resins according to the invention, or cold plastics, can be applied, for example, in a spraying, pouring or extrusion method, or manually by means of a trowel, a roller or a coating bar.

In addition to the novel two-layer, particularly heat-resistant and soil-repellent road markings described, an equally novel method for laying thereof is also part of the present invention. This method has the following process steps:

a) mixing the components of a 2-pack reactive resin which, after curing, forms the lower, first layer, b) applying the reactive resin from method step a) to the surface to be coated, for example a road surface, within the pot life of the reactive resin, c) optionally mixing the components which, after curing, form the upper, second layer, d) applying the reactive resin for formation of the second, upper layer to the first, lower layer already applied to the surface in method step b) within the pot life of the reactive resin and e) optionally sprinkling, wherein method step e) can be conducted before, parallel to or after method step d). According to the juncture, the glass beads are embedded to a greater or lesser extent into the matrix of the upper, second layer.

Method step c), as described, is optional, since a 2-pack reactive resin need not necessarily be used. In a further alternative, it is possible, for example, to cure the reactive resin for formation of the upper, first layer by means of radiative curing, in which case preference is given to adding appropriate curing agents to the reactive resin, or plasma curing.

In the variant of a 2-pack reactive resin including at least one accelerator and at least one initiator, the optional method step c) of mixing the 2-pack system is conducted before, in parallel with or after method steps a) or b). The exact juncture depends particularly on the respective pot lives and hence the open times for application of the two layers.

In a particular embodiment of this variant, the second layer is applied in method step d) after performance of the non-optional method step c) and after curing of the first, lower layer. In this case, it is especially possible to sprinkle on a sprinkling agent in at least one of the two layers or in both layers within the respective pot life.

In a third variant of the method, the application of the second layer in method step d) which does not itself contain any initiator but preferably does contain an accelerator in the form of one of the above-described amines is effected without performance of a mixing operation according to method step c) within the pot life of the first, lower layer. In this case, initiators and/or free radicals diffuse out of the first, lower layer which is in the process of curing into the second, upper layer which has just been applied, and initiate curing therein. The performance of this third variant is less complex, since method step c) can be dispensed with. Optionally, in this method variant too, it is possible to sprinkle on sprinkling agents in one of the two layers or in both layers within their respective pot lives.

Irrespective of the variant of the method, the laying of the road marking is preferably conducted by machine, or by means of a vehicle or a device. In this case, the first, lower layer is firstly applied from one or more outlet devices to the trafficway surface or other outer surface according to method step b). Subsequently, preferably within the pot life of the first layer, the second layer without initiator is sprayed by means of one or more outlet devices according to method step d) onto the first, as yet uncured layer, and the optional laying of glass beads from one or more optional outlet devices onto one of the two layers according to method step e) is conducted within the pot life of the layer in question. For example, the three outlet devices are not more than 2 m, preferably not more than 1 m, apart in movement direction and are operated simultaneously. Thus, the reactive resin seal of the second, upper layer can be effected in a simple manner in a 1-pack method, for instance by spraying with conventional 1-pack paint spraying machines, and the pot life problem in the processing method in a mixture with curing agent which is otherwise customary can be avoided. The outlet devices may, for example, be nozzles.

The pot life, which can also be referred to as the open time, of the 2-pack reactive resins depends particularly on the respective composition of the reactive resin, the nature and concentration of the initiators and accelerators, and the temperature at which application is effected. A pot life of this kind which is common in the prior art is, for example, between 2 and 40 min. For safer laying of the marking, for example, mixing of the components in method steps a) and c) is possible during processing in modern marking machines which have a mixing chamber upstream of the application nozzle.

More particularly, the two-layer road markings according to the invention are applied in a process in which glass beads are added before, during or directly after the application of the cold plastic to a trafficway surface.

The examples given below are given for better illustration of the present invention, but they are incapable of limiting the invention to the features disclosed therein.

EXAMPLES

Preliminary Stage 1 First Layer of the Road Marking

A 2-pack cold plastic material for a conventional one-layer road marking is formulated as follows on the basis of a 2-pack reactive resin binder DEGAROUTE 465 from Evonik Industries AG. This reactive resin contains between 3% and 15% by weight of crosslinker, between 30% and 40% by weight of MMA, between 15% and 40% by weight of n-butyl acrylate and between 0.5% and 2.0% by weight of a mixture of two tertiary amines:

TABLE 1

| Cold plastic formulation | |
|---|---|
| Reactive resin: | 20% by weight of DEGAROUTE 465 |
| Dispersing additive: | 0.1% by weight of Disperbyk 163 |
| Rheology additive: | 0.1% by weight of Disperbyk D 410 |
| Rheology additive: | 0.1% by weight of Bentone 27 |
| Pigment: | 10% by weight of titanium dioxide |
| Fine filler: | 20% by weight of Omyacarb 15GU |
| Coarse filler: | 25% by weight of Cristobalite M72 |
| Premix beads: | 25% by weight of glass beads (50-250 μm) |

The cold plastic material is mixed with 2% by weight of curing agent powder from Evonik Industries AG (benzoyl peroxide, 50% in phthalate) and applied to a surface at 23° C. by means of a line marker with gap width 2 mm, the pot life being 10 minutes and the curing time 30 minutes.

When this road marking is used, especially on busy tarmac roads and with persistently dry, hot weather conditions with daytime temperatures above 35° C., this conventional one-layer road marking becomes highly soiled and cannot be cleaned again by water (for example in the form of rain).

Comparative Example 1: Noninventive Two-Layer Road Marking

First of all, the cold plastic material from Preliminary Stage 1 is applied as described to the surface as the first layer together with 2% by weight of curing agent powder. After this first layer has cured, i.e. after 30 minutes, a noninventive reactive resin seal is applied to the cured first layer as the second layer in the form of a mixture of 4% by weight of curing agent powder and 96% by weight of pure DEGAROUTE 465 2-pack reactive resin in a layer of thickness 200 μm by means of a roller.

DEGAROUTE 465 is a 2-pack reactive resin having a dynamic viscosity of 200 mPas measured at 23° C. to DIN 53018 by means of Brookfield DV-II with 1/30 rpm spindle, which has the following properties after curing and conditioning for 72 h:

Glass transition temperature: <30° C. (DIN EN ISO 11357-1)

Tensile strain at break: 230% (DIN EN ISO 527 at 23° C.)

Tensile strength: 7 MPa (DIN EN ISO 527 at 23° C.)

This noninventive two-layer road marking becomes highly soiled under the use conditions specified in Example 1 and cannot be cleaned again by water (for example in the form of rain).

Example 1: Inventive Two-Layer Road Marking and Inventive Reactive Resin Seal For production of the inventive reactive resin seal, the polymer component used is a suspension polymer consisting exclusively of methyl methacrylate (MMA) monomer units and having a molar mass of 80 000 g/mol (Mw) (determined by SEC against PMMA standards) and a glass transition temperature $T_g$ of 116° C. (determined to DIN EN ISO 11357-1).

This polymer component was dissolved in methyl methacrylate, and mixed with the other constituents according to the following composition (see Table 2):

TABLE 2

| | |
|---|---|
| Polymer component: | 22% by weight of suspension polymer |
| Monomer component: | 63.5% by weight of methyl methacrylate |
| Crosslinker: | 5% by weight of butane-1,4-diol dimethacrylate |
| Accelerator: | 2% by weight of N,N-bis-(2-hydroxypropyl)-p-toluidine |
| Plasticizer: | 5% by weight of tributyl O-acetylcitrate |
| Additives: | 2.5% by weight |

This mixture, i.e. the liquid reactive resin seal, at 23° C. has a dynamic viscosity of 80 mPas (measured to DIN 53018 by means of Brookfield DV-II with 1/30 rpm spindle).

By mixing the reactive resin seal with 1% by weight of initiator (benzoyl peroxide, curing agent powder from Evonik Industries AG), curing of the seal is induced at room temperature, with a pot life of 9 minutes and a curing time of 27 minutes, and the cured reactive resin seal after conditioning for 72 h has the following properties:

Glass transition temperature: 74° C. (DIN EN ISO 11357-1)

Tensile strain at break: 2% (DIN EN ISO 527 at 23° C.)

Tensile strength: 40 MPa (DIN EN ISO 527 at 23° C.)

Tensile modulus of elasticity: 2800 MPa (DIN EN ISO 527 at 23° C.)

For production of the inventive two-layer road marking, the cold plastic material from Preliminary Stage 1 is applied as described therein to the surface as the first layer together with 2% by weight of curing agent powder. After this first layer has cured, i.e. after 30 minutes, inventive reactive resin seal is applied to the cured first layer as the second layer in the form of a mixture of 1% by weight of curing agent powder and 99% by weight of pure 2-pack reactive resin (composition according to Table 2) in a layer of thickness 150 μm by means of a roller, and cures to give a tack-free surface after about 30 minutes.

When used on busy tarmac roads and with persistently dry, hot weather conditions with daytime temperatures above 35° C., this inventive two-layer road marking becomes less soiled compared to conventional one-layer markings or the noninventive two-layer marking from Comparative Example 1, and can be cleaned again better by water (for example in the form of rain).

Example 2: Inventive Two-Layer Road Marking

For production of this inventive two-layer road marking, the cold plastic material from Example 1 is again applied as described therein to the surface as the first layer together with 2% by weight of curing agent powder. Within 2 minutes after the application of the first layer, i.e. before the pot life of the first layer has elapsed, the inventive reactive resin seal according to Example 1 is sprayed onto the still-fresh first layer with a layer thickness of 200 μm as the second layer without addition of initiators in an airless spraying method with a 1-pack spraying machine at pressure 180 bar. The second layer which does not itself contain any initiator is initiated exclusively via the first layer beneath. After 30 minutes, the surface of the two-layer marking has cured to give a tack-free surface.

In this process, exclusively non-initiated reactive resin seal is stored and processed in the machine, and so it is possible to use conventional 1-pack spraying machines, and the risk of polymerization of the seal in the reservoir vessel in the machine or in the spraying machine itself is avoided.

The marking produced by this application method features low soil uptake and good cleaning properties, like the marking produced by the application method specified in Example 1.

Example 3

A conventional 2-pack cold (sprayable) plastic for the lower layer is formulated as follows on the basis of a 2-pack reactive resin binder DEGAROUTE 680 from Evonik Industries AG:

TABLE 3

| Cold sprayable plastic formulation | |
|---|---|
| Reactive resin: | 35% by weight of DEGAROUTE 680 |
| Dispersing additive: | 0.5% by weight of Disperbyk 163 |
| Rheology additive: | 0.1% by weight of Disperbyk D 410 |
| Pigment: | 10% by weight of titanium dioxide |
| Fine filler: | 54.4% by weight of Omyacarb 15GU |

This cold plastic material at 23° C., after 2% by weight of curing agent powder has been mixed in, has a pot life of 1 min and a curing time of 2.5 minutes, and corresponds to a composition as per claims 6 and 7.

This cold plastic material is mixed automatically in an airless 2-pack spraying machine with 2% by weight of Benox L 40 LV liquid curing agent from United Initiators (benzoyl peroxide 40% dispersion) and sprayed on in an airless method at 120 bar from a first spray nozzle onto the surface as the first layer with a thickness of 600 μm, while moving the machine forward at a speed of 7 kilometres per hour. Mounted on the same spraying machine, viewed counter to the running direction, at a distance of 60 cm after the airless spray nozzle, is an airspray nozzle with which the inventive reactive resin seal from Example 1 is sprayed onto the fresh first layer as the second layer with a thickness of 125 μm without addition of an initiator with atomizer air pressure 3 bar. The second layer is again initiated exclusively via the first layer beneath. The surface of this inventive road marking has cured tack-free within less than 10 minutes.

The inventive road marking becomes much less soiled on busy tarmac roads and with persistently dry, hot (daytime temperatures above 35° C.) weather conditions compared to conventional one-layer road marking, and can be cleaned again by water (for example in the form of rain).

The invention claimed is:

1. A two-layer road marking or ground coating, comprising:

a lower layer which is a cured 2-pack (meth)acrylate-based reactive resin formulation that comprises, prior to curing, in one or both packs, at least 0.3% by weight of crosslinker, at least 4% by weight of (meth)acrylate monomers, at least 2% by weight of prepolymers, and, optionally, a further additive, and an upper layer, which is a cured reactive resin seal comprising:

up to 50% by weight of at least one of a pigment, a filler, and an additive, and at least 50% by weight of a cured (meth)acrylate resin comprising at least 50% by weight of repeat units based on (meth)acrylates and having a glass transition temperature $T_g$ of at least 60° C.

2. The two-layer road marking or ground coating according to claim 1, wherein the upper layer comprises at least 80% by weight of the cured (meth)acrylate resin and not more than 20% by weight of at least one of a pigment, a filler, and an additive.

3. The two-layer road marking or ground coating according to claim 1, wherein the cured (meth)acrylate resin in the upper layer has a glass transition temperature $T_g$ of at least 70° C.

4. The two-layer road marking or ground coating according to claim 1, wherein the reactive resin seal, prior to curing to give the upper layer, comprises:

10% to 35% by weight of at least one of a poly(meth) acrylate and a polyester,

40% to 80% by weight of a monomer, which comprises at least one of a (meth)acrylate and a monomer partly copolymerizable with a (meth)acrylate, 1% to 10% by weight of crosslinker, 0% to 5% by weight of a tertiary aromatic amine, 0% to 25% by weight of at least one of a pigment and a filler, 1% to 10% by weight of at least one additive selected from the group consisting of a plasticizer, a paraffin, a UV absorber, a stabilizer, and a blueing agent, and 0.1% to 5% by weight of one or more initiators, which are combined only shortly before application with the tertiary amine in the mixture, where the poly(meth) acrylate and the polyester have a glass transition temperature Tg of at least 70° C. and the monomer component comprise at most 50% by weight of those monomers which, in the fully polymerized state, have a glass transition temperature of at least 60° C.

5. The two-layer road marking or ground coating according to claim 4, wherein the reactive resin seal, prior to curing, comprises:

15% to 25% by weight of a poly(meth)acrylate,

60% to 75% by weight of a (meth)acrylate having C1-C4-alkyl radicals,

2% to 8% by weight of at least one di- and/or tri(meth) acrylate, 0.4% to 4% by weight of a tertiary aromatic amine, 0% to 10% by weight of at least one of a pigment and a filler, 2% to 8% by weight of an additive, and 0.2% to 4% by weight of at least one of dilauroyl peroxide and dibenzoyl peroxide, where the poly(meth)acrylate and the fully polymerized (meth)acrylate each have a glass transition temperature Tg of at least 70° C.

6. The two-layer road marking or ground coating according to claim 1, wherein the two packs of the reactive resin for production of the lower layer together comprise:

0.5% by weight to 30% by weight of crosslinker,

10% by weight to 96.1% by weight of a (meth)acrylate and optionally a component copolymerizable with a (meth)acrylate, 0% by weight to 20% by weight of a urethane (meth) acrylate, 3% by weight to 45% by weight of a prepolymer, 0.1% by weight to 5% by weight of at least one tertiary amine, 0% by weight to 25% by weight of core-shell particles, 0.5% by weight to 10% by weight of at least one initiator, where the initiator(s) and the tertiary amine, prior to mixing, are present in separate packs of the 2-pack system, and optionally further auxiliaries.

7. The two-layer road marking or ground coating according to claim 6, wherein the two packs of the reactive resin of the lower layer together comprise:

2% by weight to 20% by weight of at least one of a di-(meth)acrylate, a tri-(meth)acrylate, and a tetra(meth)acrylate, 30% by weight to 80% by weight of a (meth)acrylate and optionally a component copolymerizable with a (meth) acrylate, 0% by weight to 20% by weight of a urethane (meth) acrylate, 15% by weight to 40% by weight of at least one of a poly(meth)acrylate and a polyester, 0.4% by weight to 2.0% by weight of at least one tertiary amine, 0% by weight to 20% by weight of core-shell particles, 1% by weight to 7% by weight of initiator, where the initiator and the tertiary amine are present in separate packs of the 2-pack system, and optionally further auxiliaries.

8. The two-layer road marking or ground coating according to claim 7, wherein the reactive resin of the lower layer is halogen-free, and the reactive resin comprises:

3% by weight to 15% by weight of a dimethacrylate,

30% by weight to 40% by weight of a (meth)acrylate and optionally a component copolymerizable with a (meth) acrylate, 0% by weight to 20% by weight of a urethane (meth) acrylate, 20% by weight to 30% by weight of a poly(meth)acrylate, 0.2% to 0.8% by weight of a tertiary amine, 0% by weight to 15% by weight of core-shell particles comprising a polymethacrylate, 1.5% by weight to 5% by weight of at least one of dilauroyl peroxide and dibenzoyl peroxide as initiator and optionally further auxiliaries.

9. A method for laying the two-layer road marking or ground coating according to claim 6, the method comprising:

a) mixing components of a first reactive resin for production of the lower layer, b) applying the first reactive resin to a road surface, c) optionally mixing components of a second reactive resin for production of the upper layer, d) applying the second reactive resin from said c) mixing to the lower layer, and e) optionally sprinkling with glass beads, wherein said c) mixing can be conducted before, in parallel with or after said a) mixing and said b) applying, said e) optionally sprinkling can be conducted before, in parallel with or after said d) applying, the components of said a) mixing are components for the cured 2-pack (meth)acrylate-based reactive resin formulation, and the components of said c) mixing comprise:

10% to 35% by weight of at least one of a poly(meth) acrylate and a polyester,

40% to 80% by weight of a monomer, which comprises at least one of a (meth)acrylate and a monomer partly copolymerizable with a (meth)acrylate, 1% to 10% by weight of crosslinker, 0% to 5% by weight of a tertiary aromatic amine, 0% to 25% by weight of at least one of a pigment and a filler, 1% to 10% by weight of at least one additive selected from the group consisting of a plasticizer, a paraffin, a UV absorber, a stabilizer, and a blueing agents, and 0.1% to 5% by weight of one or more initiators, which are combined only shortly before application with the tertiary amine in the mixture, where the poly(meth) acrylates and/or polyesters have a glass transition temperature Tg of at least 70° C. and the monomer component comprise at most 50% by weight of those monomers which, in the fully polymerized state, have a glass transition temperature of at least 60° C.

10. The method according to claim 9, wherein said c) mixing is carried out, and the application of the upper layer in said d) applying follows performance of said c) mixing and curing of the lower layer, with optional sprinkling of sprinkling agents into at least one of the upper and lower layers.

11. The method according to claim 9, wherein the application of the upper layer in said d) applying which does not itself contain any initiator is effected without performance of said c) mixing with optional sprinkling of sprinkling agents into at least one of the upper and lower layers.

12. The method according to claim 11, wherein that the laying is effected by machine or by a vehicle or device, with initial application of the lower layer from one or more outlet devices to the road surface or other outer surface according to said b) applying, followed by spray application of the upper layer without initiator by means of one or more outlet devices according to said d) applying to the lower, as yet uncured layer, and with optional laying of glass beads from one or more optional outlet devices onto one of the upper and lower layers according to said e) optionally sprinkling, wherein the three outlet devices are not more than 2 m apart in movement direction and are operated simultaneously.

13. The two-layer road marking or ground coating according to claim 6, wherein the reactive resin seal, prior to curing to give the upper layer, comprises:

10% to 35% by weight of at least one of a poly(meth) acrylate and a polyester,

40% to 80% by weight of a monomer, which comprises at least one of a (meth)acrylate and a monomer partly copolymerizable with a (meth)acrylate, 1% to 10% by weight of crosslinker, 0% to 5% by weight of a tertiary aromatic amine, 0% to 25% by weight of at least one of a pigment and a filler, 1% to 10% by weight of at least one additive selected from the group consisting of a plasticizer, a paraffin, a UV absorber, a stabilizer, and a blueing agent, and 0.1% to 5% by weight of one or more initiators, which are combined only shortly before application with the tertiary amine in the mixture, where the poly(meth) acrylate and the polyester have a glass transition temperature Tg of at least 70° C. and the monomer component comprise at most 50% by weight of those monomers which, in the fully polymerized state, have a glass transition temperature of at least 60° C.

14. The two-layer road marking or ground coating according to claim 1, wherein the lower layer comprises:

between 15% and 55% by weight of cured reactive resin, 0.15% by weight to 25% by weight of an inorganic pigment, 0% by weight to 5% by weight of at least one of a stabilizer and an additive, and 20% by weight to 80% by weight of at least one of a mineral and a polymeric filler.

15. The two-layer road marking or ground coating according to claim 1, wherein the upper layer at 23° C. has a tensile strain at break, measured to DIN 527, of less than 10%, and wherein the (meth)acrylate resin of the upper layer, prior to application, has a viscosity at 23° C., measured to DIN 53015, of between 50 and 500 mPas.

16. The two-layer road marking or ground coating according to claim 15, wherein the tensile strain at break is less than 5%, and wherein the viscosity of the (meth)acrylate resin prior to application is between 50 and 250 mPas.

17. The two-layer road marking or ground coating according to claim 1, wherein the upper layer has a thickness of not more than 500 μm.

18. The two-layer road marking or ground coating according to claim 17, wherein the upper layer has a thickness of not more than 200 μm.

19. The two-layer road marking or ground coating according to claim 1, wherein the two packs of the reactive resin for production of the lower layer together comprise:

0.5% by weight to 30% by weight of crosslinker,

30% by weight to 40% by weight of a (meth)acrylate and optionally a component copolymerizable with a (meth) acrylate, 4% by weight to 20% by weight of a urethane (meth) acrylate, 20% by weight to 45% by weight of a prepolymer, 0.1% by weight to 5% by weight of at least one tertiary amine, 1% by weight to 25% by weight of core-shell particles, 0.5% by weight to 10% by weight of at least one initiator, where the initiator(s) and the tertiary amine, prior to mixing, are present in separate packs of the 2-pack system, and optionally further auxiliaries.

* * * * *